US012063252B2

(12) United States Patent
Sawal et al.

(10) Patent No.: US 12,063,252 B2
(45) Date of Patent: Aug. 13, 2024

(54) AUTOMATIC HANDLING OF SECURITY DRIFT IN CLOUD ENVIRONMENTS

(71) Applicant: Dell Products L.P., Round Rock, TX (US)

(72) Inventors: Vinay Sawal, Fremont, CA (US); Jayanth Kumar Reddy Perneti, Bangalore (IN); Vindhya Gangaraju, Davanagere (IN)

(73) Assignee: Dell Products L.P., Round Rock, TX (US)

( * ) Notice: Subject to any disclaimer, the term of this patent is extended or adjusted under 35 U.S.C. 154(b) by 449 days.

(21) Appl. No.: 17/476,545

(22) Filed: Sep. 16, 2021

(65) Prior Publication Data

US 2023/0081915 A1 Mar. 16, 2023

(51) Int. Cl.
| | |
|---|---|
| *G06F 17/18* | (2006.01) |
| *G06F 40/216* | (2020.01) |
| *G06F 40/289* | (2020.01) |
| *H04L 9/40* | (2022.01) |
| *H04L 67/10* | (2022.01) |

(52) U.S. Cl.
CPC .............. *H04L 63/20* (2013.01); *G06F 17/18* (2013.01); *G06F 40/216* (2020.01); *G06F 40/289* (2020.01); *H04L 67/10* (2013.01)

(58) Field of Classification Search
CPC ......... H04L 63/20; H04L 67/10; H04L 67/34; G06F 17/18; G06F 40/216; G06F 40/289; G06F 40/194; G06F 40/274
See application file for complete search history.

(56) References Cited

U.S. PATENT DOCUMENTS

| | | | |
|---|---|---|---|
| 2016/0191561 A1* | 6/2016 | Eskin ................. | H04L 63/1425 726/23 |
| 2019/0073415 A1* | 3/2019 | Franceschini ............ | G06N 5/01 |
| 2021/0035116 A1* | 2/2021 | Berrington ............... | G06N 5/04 |
| 2021/0184928 A1* | 6/2021 | Lal ........................ | H04L 41/5048 |
| 2022/0198322 A1* | 6/2022 | Kuperman ............. | G06N 20/00 |
| 2022/0232024 A1* | 7/2022 | Kapoor ................... | G06F 21/57 |
| 2022/0342846 A1* | 10/2022 | Kunchakarra ......... | G06N 20/00 |

OTHER PUBLICATIONS

A Survey on Optimal Transport for Machine Learning: Theory and Applications (Year: 2021).*

* cited by examiner

*Primary Examiner* — Taghi T Arani
*Assistant Examiner* — Pegah Barzegar
(74) *Attorney, Agent, or Firm* — Kirton McConkie; Brian Tucker

(57) ABSTRACT

Security drift can be automatically handled in cloud environments. A security audit engine can be configured to extract security configuration datasets from cloud resources and create text sentences from the datasets as well as from a golden configuration. These text sentences can be encoded as vectors in an n-dimensional space. Probability distributions can then be generated using the vectors such as by using an unsupervised clustering algorithm. Distance matrixes can then be generated from the probability distributions. A probability distribution pertaining to a dataset and a probability distribution pertaining to the golden configuration can then be compared and normalized using a transport to thereby yield a security drift score representing a divergence of the corresponding security settings from the golden configuration. When a security drift score exceeds a threshold, the security audit engine can take appropriate action.

19 Claims, 8 Drawing Sheets

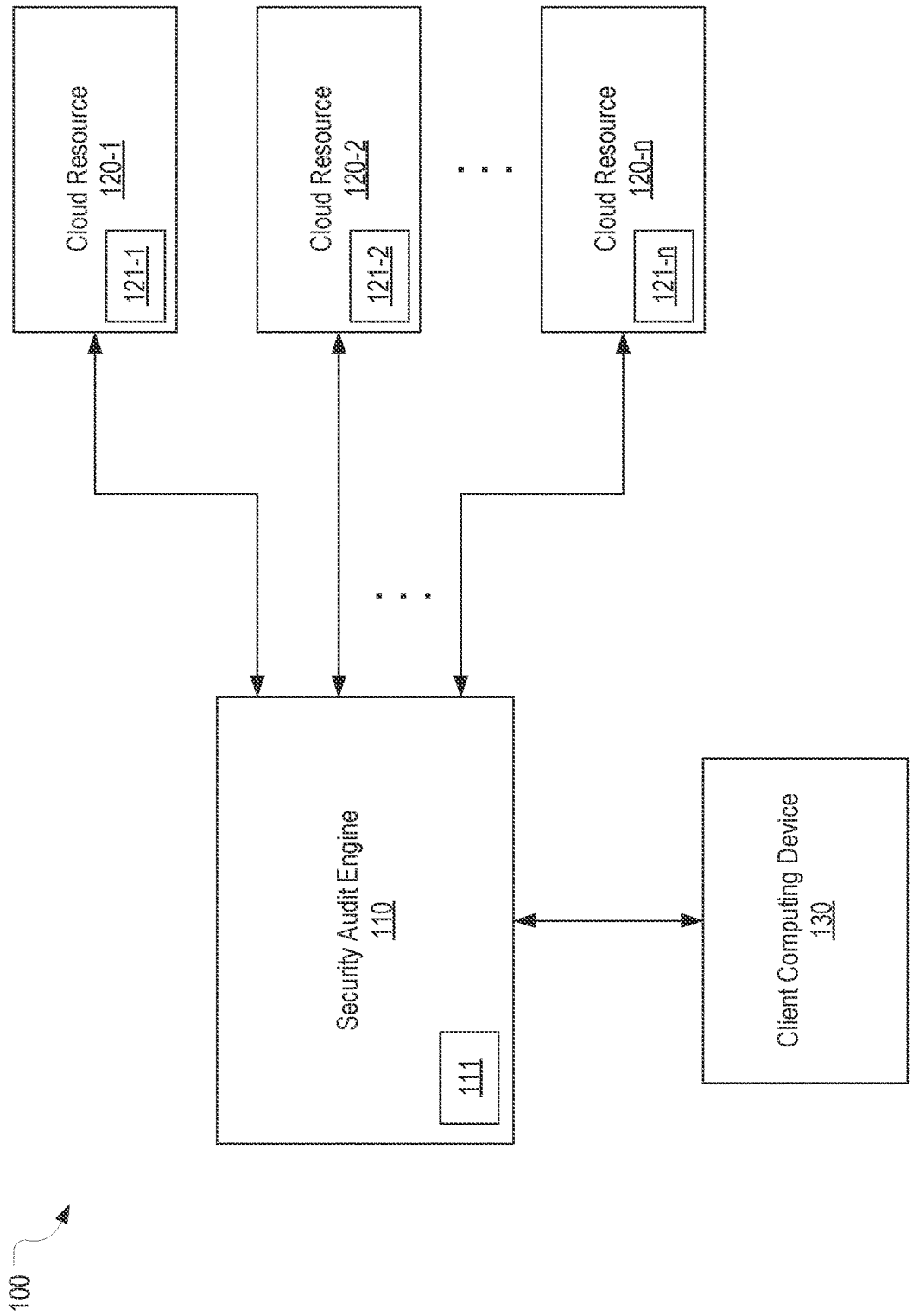

AUTOMATIC HANDLING OF SECURITY DRIFT IN CLOUD ENVIRONMENTS

CROSS-REFERENCE TO RELATED APPLICATIONS

N/A

BACKGROUND

Companies oftentimes use a cloud environment (e.g., Microsoft Azure, Amazon Web Services, Google Cloud, etc.) to deploy their virtual machines, applications or other resources ("cloud resources"). These cloud environments provide options for configuring security settings for cloud resources. It is common for companies to frequently check the security settings to ensure that their cloud resources are adequately protected. Additionally, companies routinely hire security consultants to audit the security of their cloud resources.

One technique that is commonly employed to verify the security of a cloud resources is to export its security settings into a text format and then perform a text-based comparison with a "golden configuration." For example, such a technique may compare one string in the current security settings with a string in the golden configuration. However, this technique does not account for the importance of any differences and does not consider context. For example, a major textual difference in the hostname configuration or description may not represent any functional difference in the cloud resource, whereas a small textual difference in the IP address, VLAN or service-level agreement parameters may represent a significant functional difference, but current text-based comparison techniques fail to account for this. Although more complex text-based comparison techniques are available, they are computationally complex and oftentimes require manual review.

BRIEF SUMMARY

The present invention extends to systems, methods and computer program products for automatically handling security drift in cloud environments. A security audit engine can be configured to extract security configuration datasets from cloud resources and create text sentences from the datasets as well as from a golden configuration. These text sentences can be encoded as vectors in an n-dimensional space. Probability distributions can then be generated using the vectors such as by using an unsupervised clustering algorithm. Distance matrixes can then be generated from the probability distributions. A probability distribution pertaining to a dataset and a probability distribution pertaining to the golden configuration can then be compared and normalized using a transport to thereby yield a security drift score representing a divergence of the corresponding security settings from the golden configuration. When a security drift score exceeds a threshold, the security audit engine can take appropriate action.

In some embodiments, the present invention may be implemented as a method for automatically handling security drift in cloud environments. A first security configuration dataset representing security settings on a first cloud resource can be obtained. A first set of text sentences can be generated from the first security configuration dataset. A first probability distribution can be created for the first set of text sentences. A first distance matrix can be created for the first probability distribution. The first distance matrix can be compared to a distance matrix for a golden configuration to thereby generate a security drift score. The security drift score represents a divergence of the security settings on the first cloud resource from the golden configuration.

In some embodiments, the present invention may be implemented as computer storage media storing computer executable instructions which when executed implement a method for automatically handling security drift in cloud environments. A first set of text sentences can be generated based on security settings on a first cloud resource. A first probability distribution can be created for the first set of text sentences. A first distance matrix can be created for the first probability distribution. A transport can be applied to the first distance matrix and a distance matrix for a golden configuration to thereby generate a security drift score. The security drift score represents a divergence of the security settings on the first cloud resource from the golden configuration.

In some embodiments, the present invention may be implemented as method for automatically handling security drift in cloud environments. Security settings on a cloud resource can be accessed. A security configuration dataset can be generated from the security settings. A set of text sentences can be generated from the security configuration dataset. The set of text sentences can be encoded as vectors. A probability distribution can be created from the vectors. A distance matrix can be created for the probability distribution. A transport can be applied to the distance matrix and a distance matrix for a golden configuration to thereby generate a security drift score. The security drift score represents a divergence of the security settings on the cloud resource from the golden configuration.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 1 illustrates an example computing environment in which embodiments of the present invention may be implemented.

DETAILED DESCRIPTION

Figure 2A:
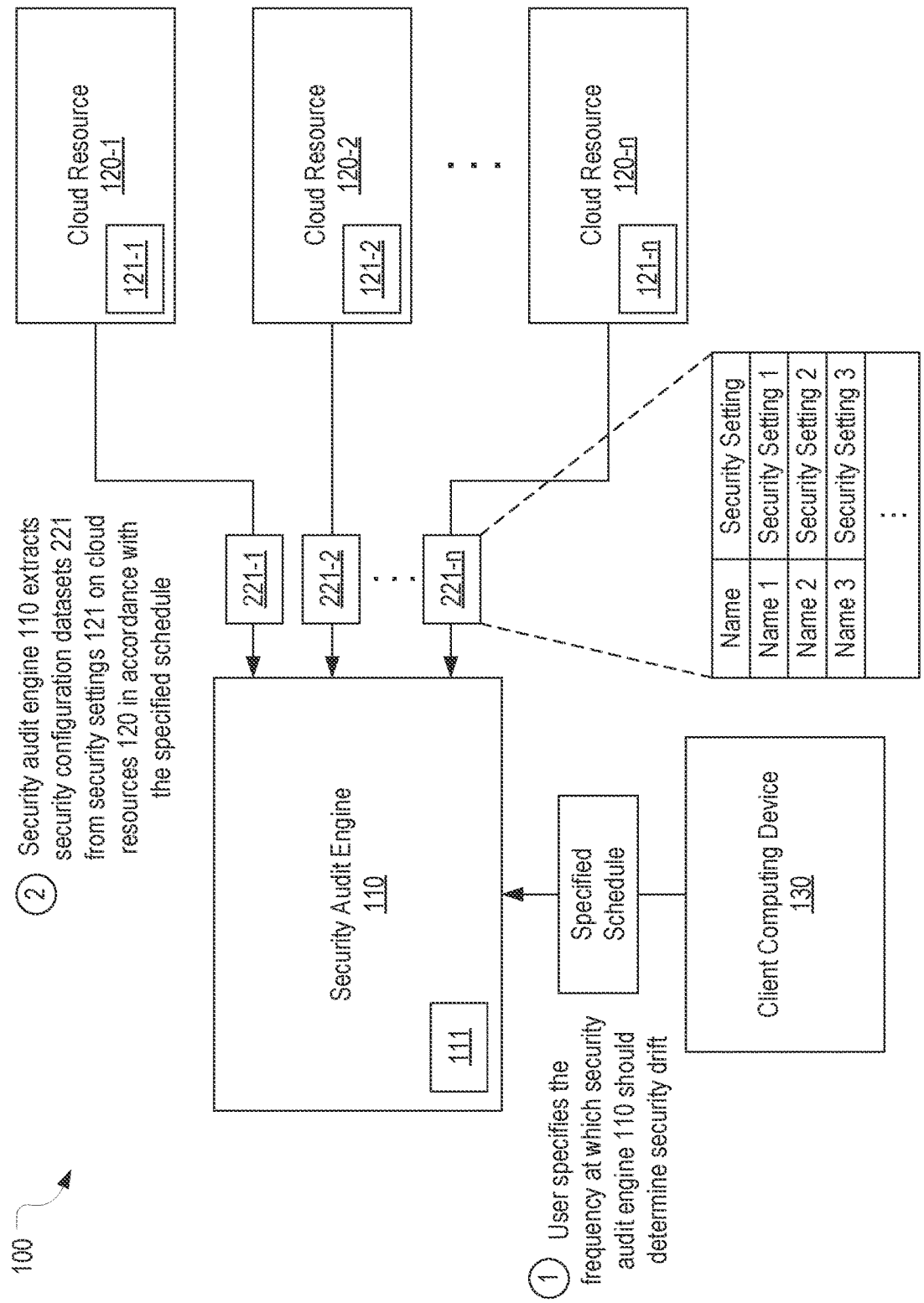
FIGS. 2A-2G provide an example of how a security audit engine may automatically handle security drift in a cloud environment in accordance with one or more embodiments of the present invention.

FIG. 1 illustrates an example computing environment 100 in which embodiments of the present invention could be implemented. Computing environment 100 includes a security audit engine 110 that can be configured to interface with a number of cloud resources 120-1 through 120-n (individually or collectively cloud resource(s) 120) to perform the functionality described herein. Cloud resources 120 could be virtual machines, applications or any other resource that may be hosted in a cloud environment and may have security settings.

For purposes of this specification, it can be assumed that each of cloud resources 120 pertains to a single company. However, security audit engine 110 could, and typically would, interface with cloud resources pertaining to any number of companies or other entities. It will also be assumed that client computing device 130 is a computing device that the single company uses to interface with security audit engine 110 (e.g., an admin's laptop).

Each of cloud resources 120-1 through 120-$n$ includes security settings 121-1 through 121-$n$ respectively (individually or collectively security settings 121). In this context, security settings may encompass any configuration setting that may be considered in analyzing the security of a cloud resource. As examples only, security settings 121 could include a virtual private cloud (VPC) identifier, a subnet, a public IP address, a private IP address, an elastic IP address, a VLAN setting, a hostname, a quality-of-service parameter, an access control list parameter, etc. Security audit engine 110 can be configured to read security settings 121 from cloud resources 120.

Security audit engine 110 includes a golden configuration 111 which can define ideal security settings for cloud resources 120. In some embodiments, a company may interface with security audit engine 110 to define at least a portion of golden configuration 111 for cloud resources 120. In some embodiments, security audit engine 110 could compile at least a portion of golden configuration 111 using preferred or recommended security settings for the cloud environment in which cloud resources 120 are hosted. In this example, it is assumed that golden configuration 111 applies to each of cloud resources 120 such as may be the case when cloud resources 120 are equivalent virtual machines or applications. However, different golden configurations could apply to different groupings of cloud resources 120. Of importance is that security audit engine 110 can maintain or obtain a golden configuration for a particular cloud resource 120 to enable the particular cloud resource 120's security settings to be audited.

In accordance with embodiments of the present invention, security audit engine 110 can be configured to retrieve security settings 121 from each cloud resource 120 and create, from security settings 121, security configuration datasets for each cloud resource 120. Security audit engine 110 can then apply an algorithm to the security configuration datasets to calculate the amount of security drift in each security configuration dataset. In other words, security audit engine 110 can calculate the degree to which the corresponding cloud resource 120's security settings 121 diverge from golden configuration 111. Based on the calculated security drift, security audit engine 110 can be configured to take action such as to automatically adjust security settings 121 or to notify an administrator when the amount of security drift exceeds a threshold. In some embodiments, security audit engine 110 may be configured to assign a rank (e.g., red, yellow and green) to each cloud resource 120 based on the calculated security drifts. Such ranks may be used to quickly identify cloud resources 120 that require attention.

As an overview, the algorithm that security audit engine 110 may utilize can include, for a cloud resource 120, creating text sentences from security configuration dataset 221 and using sentence embedding techniques to encode each text sentence as a vector in an n-dimensional space. Likewise, text sentences of golden configuration 111 can also be encoded as a vector in the n-dimensional space. In this n-dimensional space, each embedded sentence will have a point value that represents the embedded sentence's position relative to all other embedded sentences. The distance between two embedded sentences in the n-dimensional space can represent the similarity of the two textual sentences and can provide feature level context for each textual sentence. Transformer-based machine learning techniques for natural language processing (e.g., bidirectional encoder representations from transformers or BERT) can be used to create a probability distribution of all sentence embeddings in the n-dimensional space by using unsupervised clustering techniques. With these probability distributions, a distance matrix can be generated to represent pair-wise distance between each point and every other point. Importantly, the distance matrix can define the pair-wise distance between the points for the embedded sentences corresponding to security settings 121 relative to the points for embedded sentences corresponding to golden configuration 111.

FIGS. 2A-2G provide an example, in the context of FIG. 1, of how security audit engine 110 can automatically handle security drift that may occur on cloud resources 120 in accordance with one or more embodiments of the present invention. Turning to FIG. 2A, in step 1, a user of client computing device 130 may specify to security audit engine 110 a frequency or schedule for determining the security drift of cloud resources 120. Security audit engine 110 could provide a web-based or other interface for this purpose. As an example, the user could specify that security audit engine 110 should determine the security drift on a weekly or monthly basis.

In step 2 and in accordance with the specified schedule for determining security drift, security audit engine 110 can extract security configuration datasets 221-1 through 221-$n$ (individually or collectively security configuration dataset(s) 221) from security settings 121 on each cloud resource 120. As shown, a security configuration dataset 221 can be a labeled dataset. In particular, security audit engine 110 can extract each security setting in security settings 121 and associate a name or identifier with the security setting.

Figure 2B:
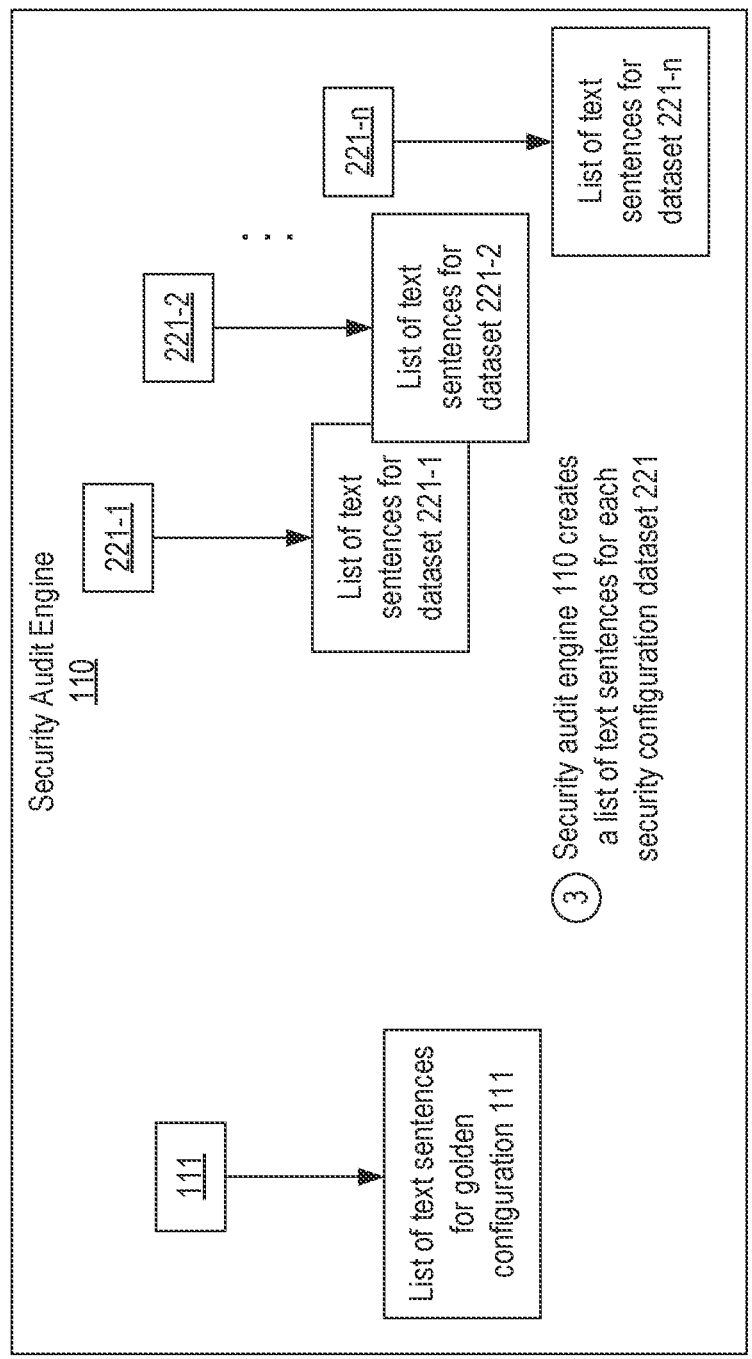

Turning to FIG. 2B, in step 3, security audit engine 110 can create a list of text sentences for each security configuration dataset 221. For example, because each security configuration dataset 221 is a labeled dataset, security audit engine 110 can treat it as a configuration tree and traverse all valid terminal paths from root to all intermediate nodes and from root to all leaves to create the text sentences. As a simplified example, if a security configuration dataset 221 includes a network access control list, security audit engine 110 may create a text sentence that includes each entry in the access control list such as "Permit W Permit Y Permit Z Deny all." FIG. 2B also shows that security audit engine 110 can create a list of text sentences for golden configuration 111. Security audit engine 110 could do so at any time such as upon receiving golden configuration 111 or at the same time as performing step 3.

Figure 2C:
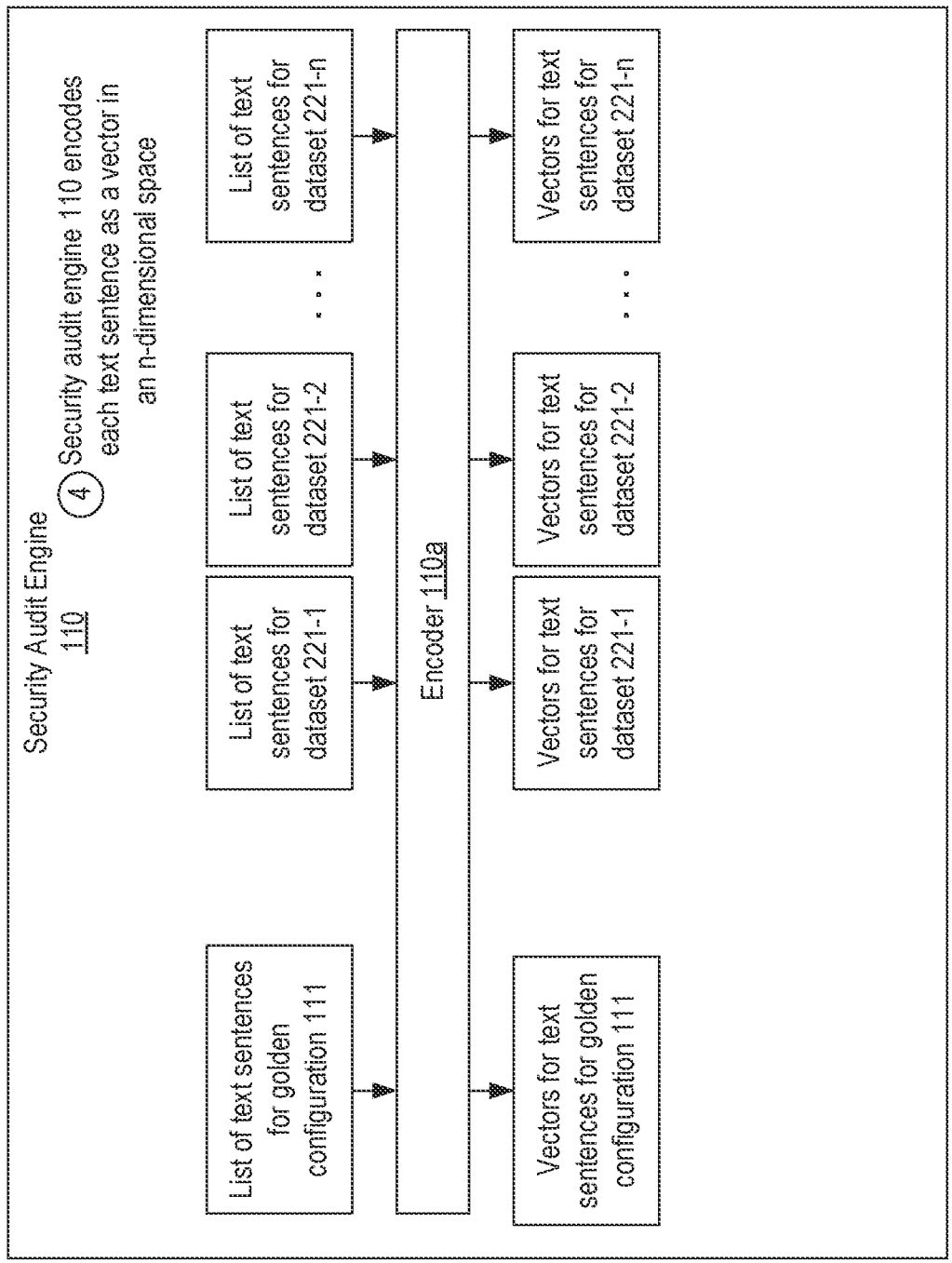

Turning to FIG. 2C, in step 4, security audit engine 110 can employ an encoder 110$a$ of a machine learning model to encode each text sentence in the list of text sentences for datasets 221 and golden configuration 111 as a vector in an n-dimensional space. As described below, in this n-dimensional space, each text sentence will have a point value that represents the text sentence's position relative to all other text sentences. The distance between point values can represent the similarity between the respective text sentences and can therefore be used to automatically determine the context of the text sentence.

Figure 2D:
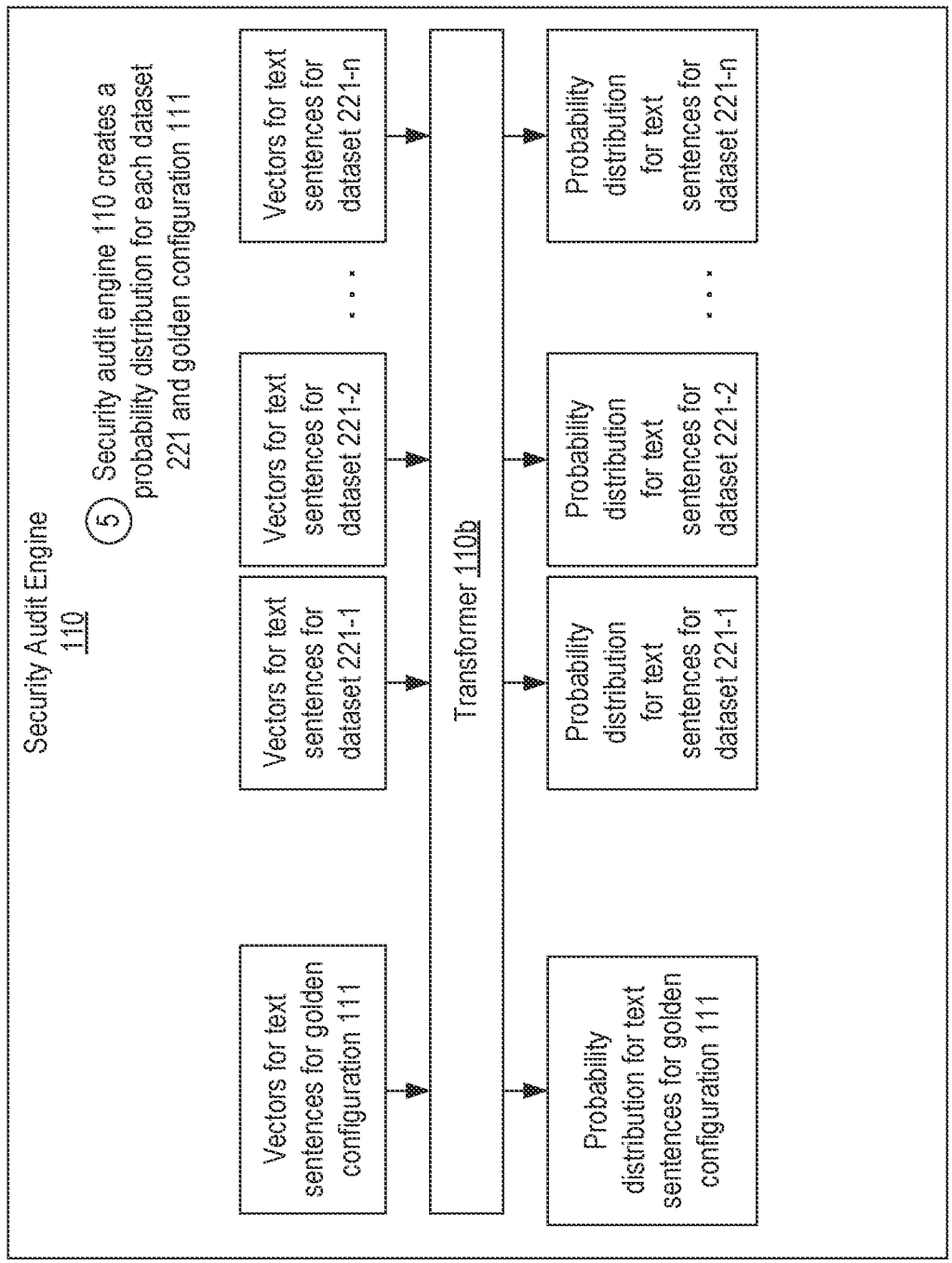

Turning to FIG. 2D, in step 5, security audit engine 110 can employ a transcoder 110$b$ (e.g., BERT or another transformer-based machine learning technique for natural language processing) on the vectors to create a probability distribution for each dataset 221 and golden configuration 111. In some embodiments, an unsupervised clustering technique may be employed to create the probability distributions. For example, a k-means clustering algorithm may be run on the vectors generated for the text sentences where a sentence segment closest to each centroid is used as the sentence embedding candidate. This process can be repeated until convergence occurs thus yielding the probability distribution.

Figure 2E:
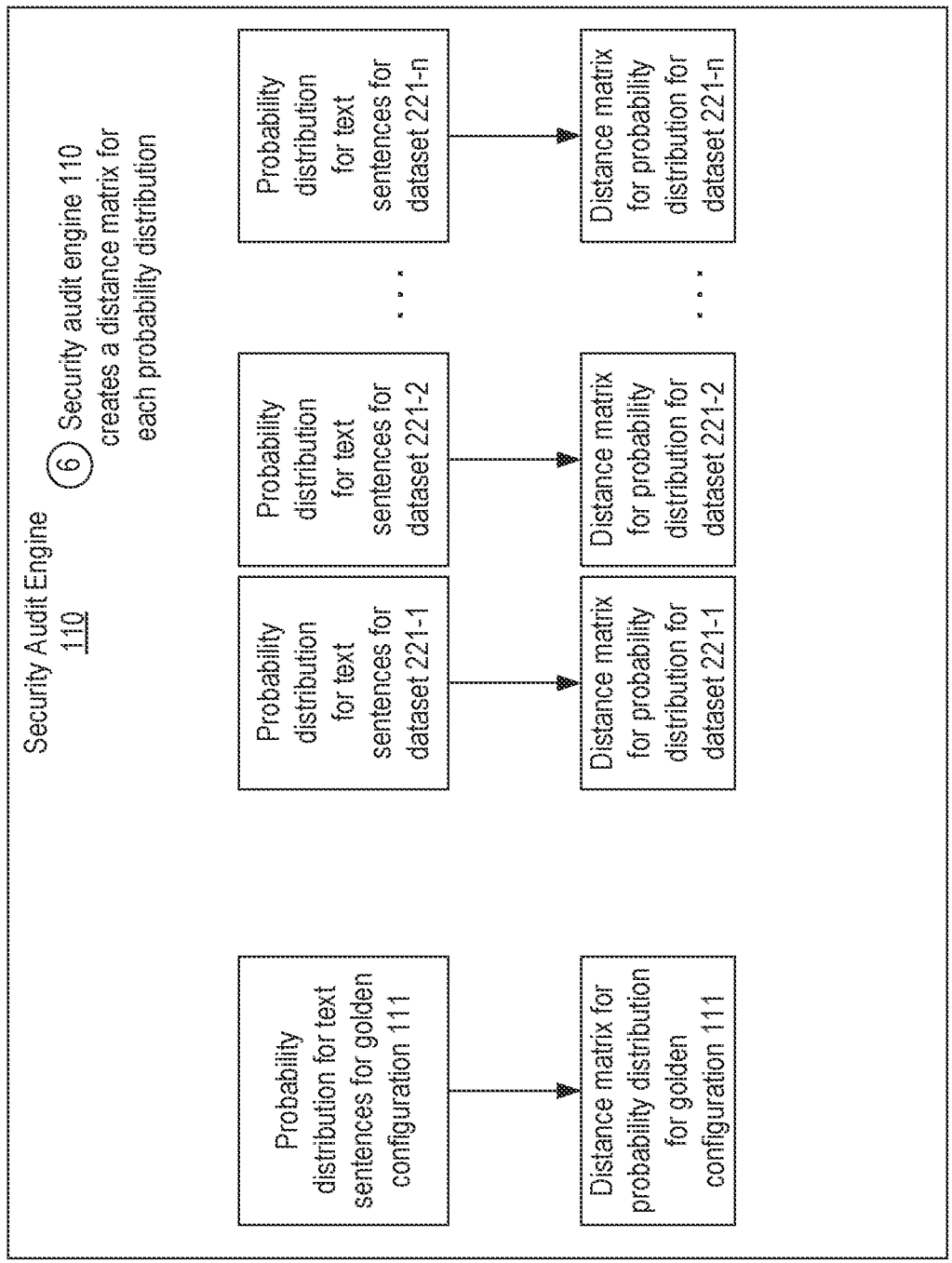

Turning to FIG. 2E, in step 6, security audit engine 110 can create a distance matrix for each probability matrix that was created in step 5. A distance matrix can represent pair-wise distance between each point value and every other point value in the probability matrix.

Figure 2F:
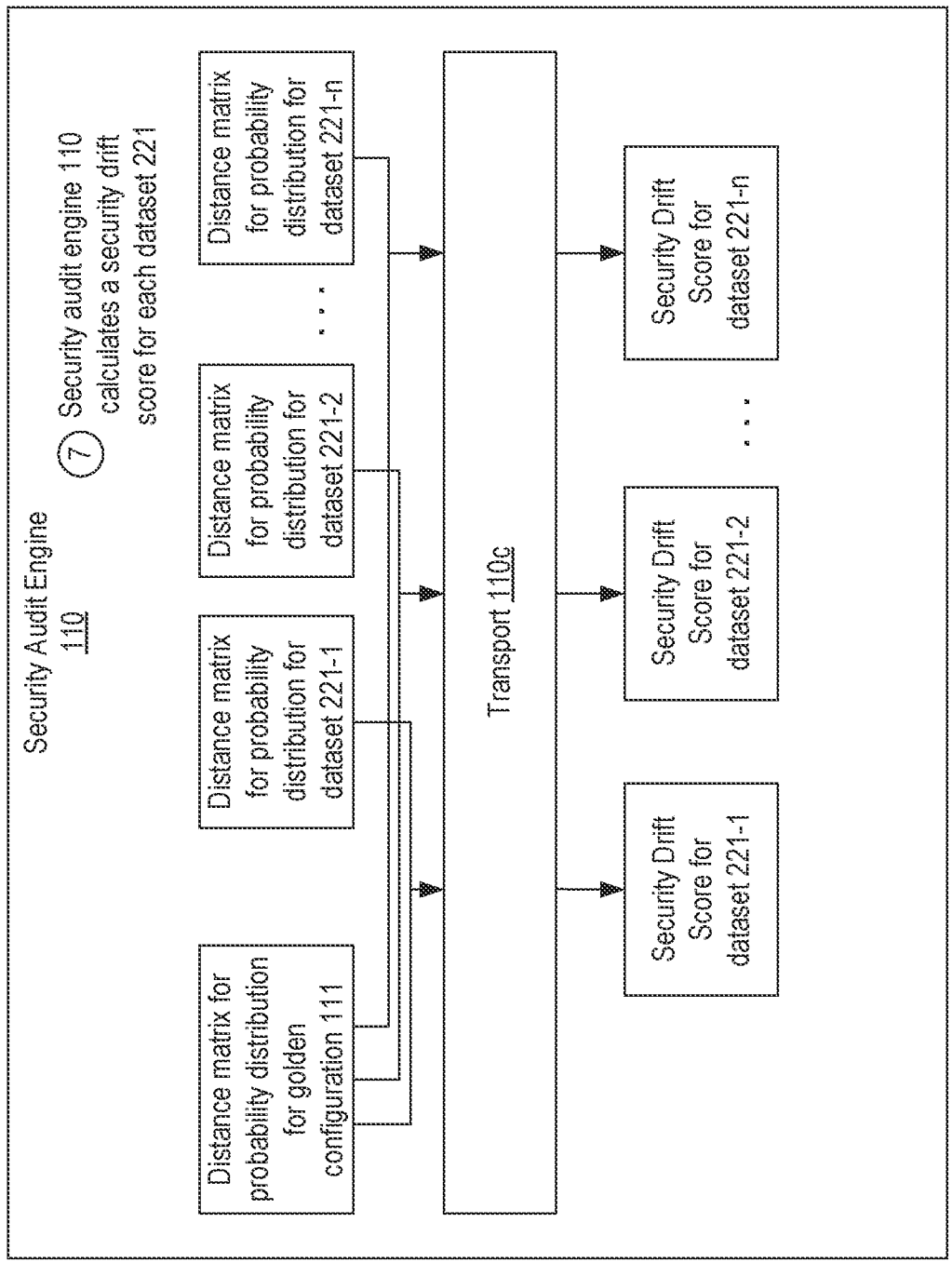

Turning to FIG. 2F, in step 7, security audit engine 110 can employ a transport 110c to calculate a security drift score for each dataset 221. In some embodiments, transport 110c can be the Optimal Transport. In some embodiments, the Kantorovich-Rubinstein (KR) metric may be applied to the Optimal Transport. For example, using transport 110c, the distance matrix created from the probability distribution for golden configuration and the distance matrix created from the probability distribution for a dataset 221 can be compared and normalized to generate a security drift score that is between 0 and 1 and which represents the distance between the two probability distributions. Security drift scores closer to 1 would represent a greater divergence of the corresponding security settings 121 from golden configuration 111.

Using the network access control list example from above, if a text sentence for the golden configuration were "Permit X Permit Y Permit Z Deny all," the text sentence for security configuration dataset 221 of "Permit W Permit Y Permit Z Deny all" would likely be considered a minimal or trivial difference using standard text comparison techniques. However, using the above-described algorithm, security audit engine 110 would be able to determine that, based on context, the one-letter difference is significant. In other words, the calculation of the security drift score would reflect the significance of the one-letter difference.

Figure 2G:
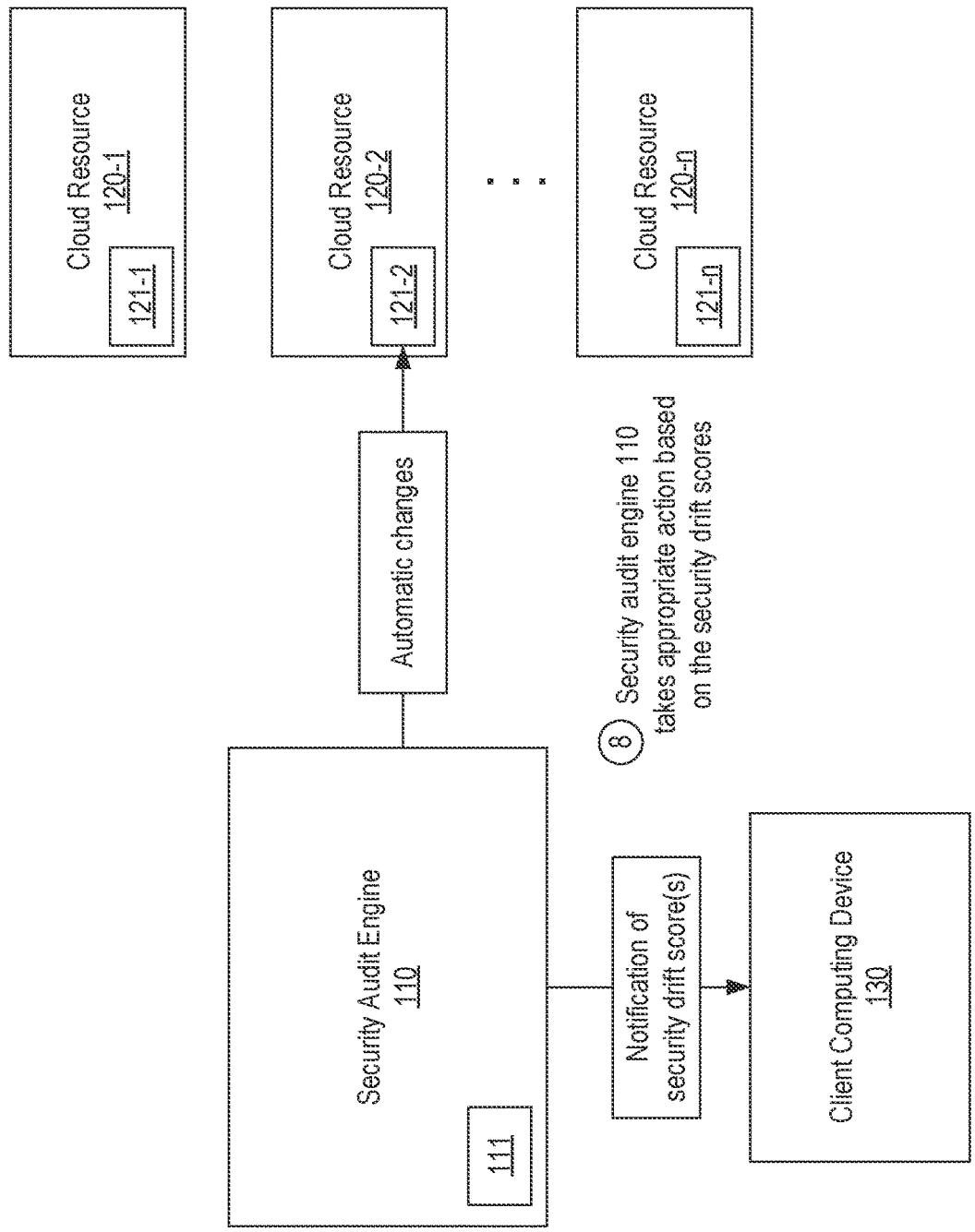

Turning to FIG. 2G, in step 8, security audit engine 110 can take appropriate action based on the security drift scores it calculated for each dataset 221. For example, in some embodiments, a policy may be defined which identifies thresholds for taking certain actions. For example, when a security drift score exceeds an upper threshold, security audit engine 110 may automatically change security settings 121 to match golden configuration 111. Similarly, when a security drift score exceeds a lower threshold but not the upper threshold, security audit engine 110 may send a notification to client computing device 130 recommending manual review of the corresponding security settings 121. For example, security audit engine 110 may be configured to assign a rank to each cloud resource 120 based on the security drift scores. In some embodiments, security audit engine 110 could employ a red, yellow and green color scheme to present the rank for each cloud resource in an interface.

To summarize, security audit engine 110 can employ a variety of machine learning and natural language processing techniques to compare security settings to a golden configuration to automatically determine security drift. By using these techniques, security audit engine 110 can consider the context of textual differences in the security settings and may therefore identify significant security concerns that even small textual differences may represent.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for automatically handling security drift in cloud environments, the method comprising:
    creating a probability distribution for a set of text sentences for a golden configuration;
    creating a distance matrix for the golden configuration from the probability distribution for the set of text sentences for the golden configuration;

obtaining a first security configuration labeled dataset representing security settings on a first cloud resource, wherein the first security configuration labeled dataset comprises the security settings in text format where each security setting is associated with a label that identifies a type of the security setting;

generating a first set of text sentences from the first security configuration labeled dataset, wherein each text sentence in the first set is generated by combining two or more of the security settings based on the labels associated with each of the two or more security settings;

creating a first probability distribution for the first set of text sentences;

creating a first distance matrix for the first probability distribution; and comparing the first distance matrix to the distance matrix for the golden configuration to thereby generate a security drift score, the security drift score representing a divergence of the security settings on the first cloud resource from the golden configuration.

2. The method of claim 1, further comprising:
encoding each of the text sentences as a vector in an n-dimensional space.

3. The method of claim 2, wherein creating the first probability distribution comprises employing a transcoder on the vectors.

4. The method of claim 2, wherein creating the first probability distribution comprises running a k-means clustering algorithm on the vectors.

5. The method of claim 1, wherein comparing the first distance matrix to the distance matrix for the golden configuration comprises employing a transport.

6. The method of claim 5, wherein the transport is the Optimal Transport.

7. The method of claim 6, wherein the Kantorovich-Rubinstein metric is applied to the Optimal Transport.

8. The method of claim 1, further comprising:
modifying the security settings on the first cloud resource based on the security drift score.

9. The method of claim 1, further comprising:
notifying a user of the security drift score.

10. The method of claim 1, wherein the first cloud resource is a virtual machine.

11. The method of claim 1, further comprising:
for each of a plurality of additional cloud resources:
  obtaining an additional security configuration labeled dataset representing security settings on the additional cloud resource;
  generating an additional set of text sentences from the additional security configuration labeled dataset;
  creating an additional probability distribution for the additional set of text sentences;
  creating an additional distance matrix for the additional probability distribution; and
  comparing the additional distance matrix to the distance matrix for the golden configuration to thereby generate an additional security drift score, the additional security drift score representing a divergence of the security settings on the additional cloud resource from the golden configuration.

12. One or more computer storage media storing computer executable instructions which when executed implement a method for automatically handling security drift in cloud environments, the method comprising:
creating a probability distribution for a set of text sentences for a golden configuration;
creating a distance matrix for the golden configuration from the probability distribution for the set of text sentences for the golden configuration;
generating a first set of text sentences from a first security configuration labeled dataset extracted from security settings on a first cloud resource, wherein the first security configuration labeled dataset comprises the security settings in text format where each security setting is associated with a label that identifies a type of the security setting and wherein each text sentence in the first set is generated by combining two or more of the security settings based on the labels associated with each of the two or more security settings;
creating a first probability distribution for the first set of text sentences;
creating a first distance matrix for the first probability distribution; and applying a transport to the first distance matrix and the distance matrix for the golden configuration to thereby generate a security drift score, the security drift score representing a divergence of the security settings on the first cloud resource from the golden configuration.

13. The computer storage media of claim 12, wherein the method further comprises:
encoding the first set of text sentences as a vector in an n-dimensional space.

14. The computer storage media of claim 12, wherein the first probability distribution is created using an unsupervised clustering algorithm.

15. The computer storage media of claim 12, wherein the method further comprises:
determining that the security drift score exceeds a threshold; and
taking an action.

16. The computer storage media of claim 15, wherein the action comprises presenting a rank for the first cloud resource based on the security drift score.

17. The computer storage media of claim 15, wherein the action comprises modifying the security settings on the first cloud resource.

18. A method for automatically handling security drift in cloud environments, the method comprising:
creating a probability distribution for a set of text sentences for a golden configuration;
creating a distance matrix for the golden configuration from the probability distribution for the set of text sentences for the golden configuration;
accessing security settings on a cloud resource;
generating a security configuration labeled dataset from the security settings, wherein the security configuration labeled dataset comprises the security settings in text format where each security setting is associated with a label that identifies a type of the security setting;
generating a set of text sentences from the security configuration labeled dataset, wherein each text sentence in the first set is generated by combining two or more of the security settings based on the labels associated with each of the two or more security settings;
encoding the set of text sentences as vectors;
creating a probability distribution from the vectors;
creating a distance matrix for the probability distribution; and
applying a transport to the distance matrix and the distance matrix for the golden configuration to thereby generate a security drift score, the security drift score representing a divergence of the security settings on the cloud resource from the golden configuration.

19. The method of claim 18, wherein the transport is the Optimal Transport.

\* \* \* \* \*